(12) United States Patent
Mueller et al.

(10) Patent No.: US 11,415,182 B2
(45) Date of Patent: Aug. 16, 2022

(54) PRINT BAR WITH COMPENSATION COUPLING

(71) Applicant: HEIDELBERGER DRUCKMASCHINEN AG, Heidelberg (DE)

(72) Inventors: Andreas Mueller, Heidelberg (DE); Burkhard Wolf, Dossenheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 801 days.

(21) Appl. No.: 16/298,014

(22) Filed: Mar. 11, 2019

(65) Prior Publication Data

US 2019/0293127 A1    Sep. 26, 2019

(30) Foreign Application Priority Data

Mar. 21, 2018   (EP) .................................... 18163049

(51) Int. Cl.
| | | |
|---|---|---|
| *B41J 2/155* | (2006.01) | |
| *F16D 13/75* | (2006.01) | |
| *F16D 3/18* | (2006.01) | |

(52) U.S. Cl.
CPC ............ *F16D 13/757* (2013.01); *B41J 2/155* (2013.01); *F16D 3/18* (2013.01)

(58) Field of Classification Search
CPC ............ F16D 13/757; F16D 3/18; B41J 2/155
USPC ............................... 464/81, 100, 157; 347/39
See application file for complete search history.

(56) References Cited

U.S. PATENT DOCUMENTS

| | | | |
|---|---|---|---|
| 3,385,407 A | | 5/1968 | Kleinhans et al. |
| 5,000,721 A | * | 3/1991 | Williams ................ F16D 7/048 |
| 5,073,145 A | | 12/1991 | Ratzokwski et al. |
| 7,397,493 B2 | * | 7/2008 | Chee ................ G03G 15/04072 |
| 2009/0244124 A1 | | 10/2009 | Kondo |

FOREIGN PATENT DOCUMENTS

| | | |
|---|---|---|
| DE | 3843825 C1 | 2/1990 |
| DE | 102011084748 A1 | 5/2012 |
| DE | 102011015642 A1 | 10/2012 |
| DE | 102011018319 A1 | 10/2012 |

* cited by examiner

*Primary Examiner* — Greg Binda
(74) *Attorney, Agent, or Firm* — Laurence A. Greenberg; Werner H. Stemer; Ralph E. Locher

(57) ABSTRACT

A print bar for inkjet printing includes print heads disposed in a row, adjustment devices for adjusting the print heads relative to one another in which each of the adjustment devices includes at least one screw and at least one shaft for rotating the at least one screw, and a compensation coupling interconnecting the screw and the shaft. The compensation coupling includes a first coupling half and a second coupling half configured to fit together under elastic deformation. The first coupling half includes spring claws having a first pitch and the first coupling half is disposed on the shaft. The second coupling half including a toothing having a second pitch and the second coupling half is disposed on the screw. The first and second pitches differ from one another.

8 Claims, 6 Drawing Sheets

PRINT BAR WITH COMPENSATION COUPLING

CROSS-REFERENCE TO RELATED APPLICATION

This application claims the priority, under 35 U.S.C. § 119, of European Patent Application EP 18 163 049.2, filed Mar. 21, 2018; the prior application is herewith incorporated by reference in its entirety.

BACKGROUND OF THE INVENTION

Field of the Invention

The present invention relates to a compensation coupling including a first coupling half and a second coupling half, in which the coupling halves may be fitted into one another under elastic deformation. The invention also relates to a print bar for inkjet printing having the compensation coupling.

German Patent DE 38 43 825 C1, corresponding to U.S. Pat. No. 5,073,145, discloses a joint that is movable in all directions for linkages and Cardan shafts. The joint is formed of two parts of identical construction made from an elastically deformable plastic, wherein the coupling members of identical construction may be fitted into one another at a 90° angle while elastic deformation occurs. That joint is usable as a quick-acting coupling in linkages or the like, in particular if such linkages require a joint that is movable in all directions to compensate for deflection. Among other applications, the joint is usable in printing machinery.

An unfavorable aspect of the joint is that due to the angular offset of 90°, the coupling members may be inserted into one another in only few angular positions relative to one another.

Thus, that prior art coupling is not suitable for use in a digital printing machine that has a print bar having an adjustment device which includes components that need to be coupled to one another in a large variety of different angular positions relative to one another. Those components include, for instance, a screw and a shaft for rotating the screw.

SUMMARY OF THE INVENTION

It is accordingly an object of the invention to provide a compensation coupling and a print bar with the compensation coupling, which overcome the hereinafore-mentioned disadvantages of the heretofore-known devices of this general type and in which the coupling halves thereof may be coupled in more angular positions relative to one another.

With the foregoing and other objects in view there is provided, in accordance with the invention, a compensation coupling, comprising a first coupling half and a second coupling half which may be fitted into one another under elastic deformation, the first coupling half having spring claws, the second coupling half having a toothing and the spring claws having a different pitch than the toothing.

An additional advantage of the invention is that it minimizes play in the compensation coupling.

Various further developments of the compensation coupling of the invention are possible:

The first coupling half may be embodied as a wheel and the spring claws may compress radially.

The second coupling half may be embodied as a star.

The toothing may have a specific length for an axial compensation.

The invention may envisage that the spring claws transmit torque and compensate for a misalignment or alignment deviations between axes of rotation of the coupling halves in terms of axial angles and/or radial axial offset.

The number of teeth of the toothing may be greater than the number of spring claws.

When the coupling halves are fitted into one another, a subset of the spring claws may engage in gaps of the toothing and a different subset of the spring claws may not engage with gaps of the toothing.

With the objects of the invention in view, there is also provided a print bar for inkjet printing, comprising print heads in a row, adjustment devices for adjusting the print heads relative to one another, each adjustment device including at least one screw and at least one shaft for rotating the screw, and the screw and the shaft being connected to one another by the compensation coupling of the invention or by one of the further developments thereof. The compensation coupling of the print bar of the invention thus includes the first coupling half and the second coupling half which may be fitted into one another under elastic deformation, the first coupling half having the spring claws and the second coupling half having the toothing, and the spring claws having a different pitch than the toothing.

Various further developments of the print bar of the invention are possible:

The second coupling half may be disposed on the screw and the first coupling half may be disposed on the shaft.

The shaft may be a motor shaft of a motor.

Other features which are considered as characteristic for the invention are set forth in the appended claims.

Although the invention is illustrated and described herein as embodied in a compensation coupling and a print bar with the compensation coupling, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
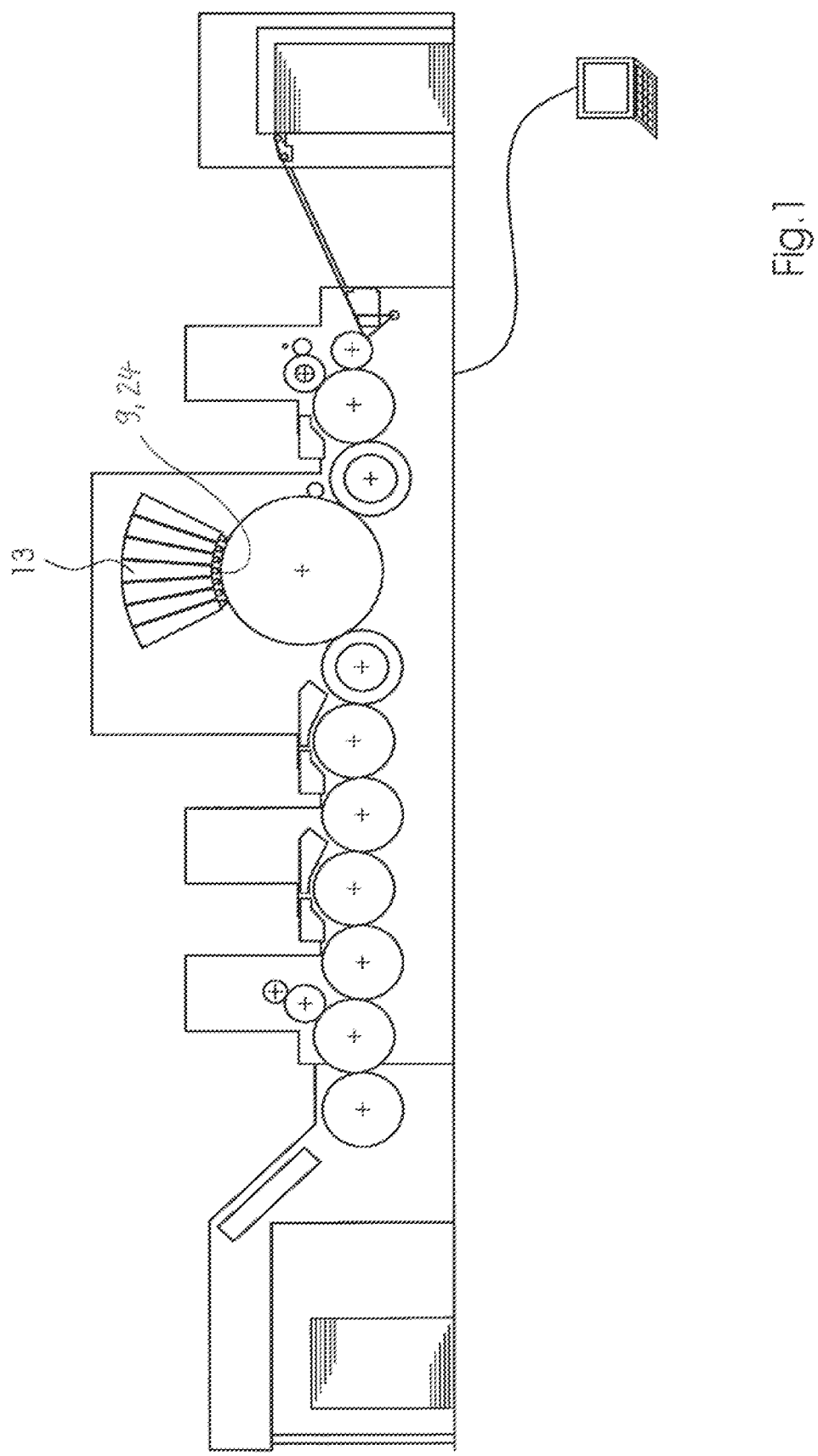
FIG. 1 is an overall diagrammatic, longitudinal-sectional view of a digital printing machine including a print bar.

Referring now in detail to the figures of the drawings, in which mutually corresponding components and elements have the same reference symbol, and first, particularly, to FIG. 1 thereof, there is seen a digital printing machine in which cylinders transport sheets from a feeder to a delivery through a number of stations. A station includes print bars 13 of identical construction for page-wide multicolor inkjet printing. Every print bar 13 prints a different color.

Every print bar 13 carries a row 24 of print heads 9 (see FIG. 2), which extends over the width of the sheets. The print heads 9 are equipped with (non-illustrated) nozzles for jetting ink. An adjustment device 10 having a stop 15 and a spring 16 is assigned to every print head 9. The adjustment devices 10 are used to adjust the print heads 9 relative to one another. In the illustrated example, an adjustment occurs linearly along the print bar 13. However, a different adjustment direction, for example in the direction of sheet transport, or a different type of adjustment motion, for example a pivoting motion, would likewise be possible.

Figure 2:
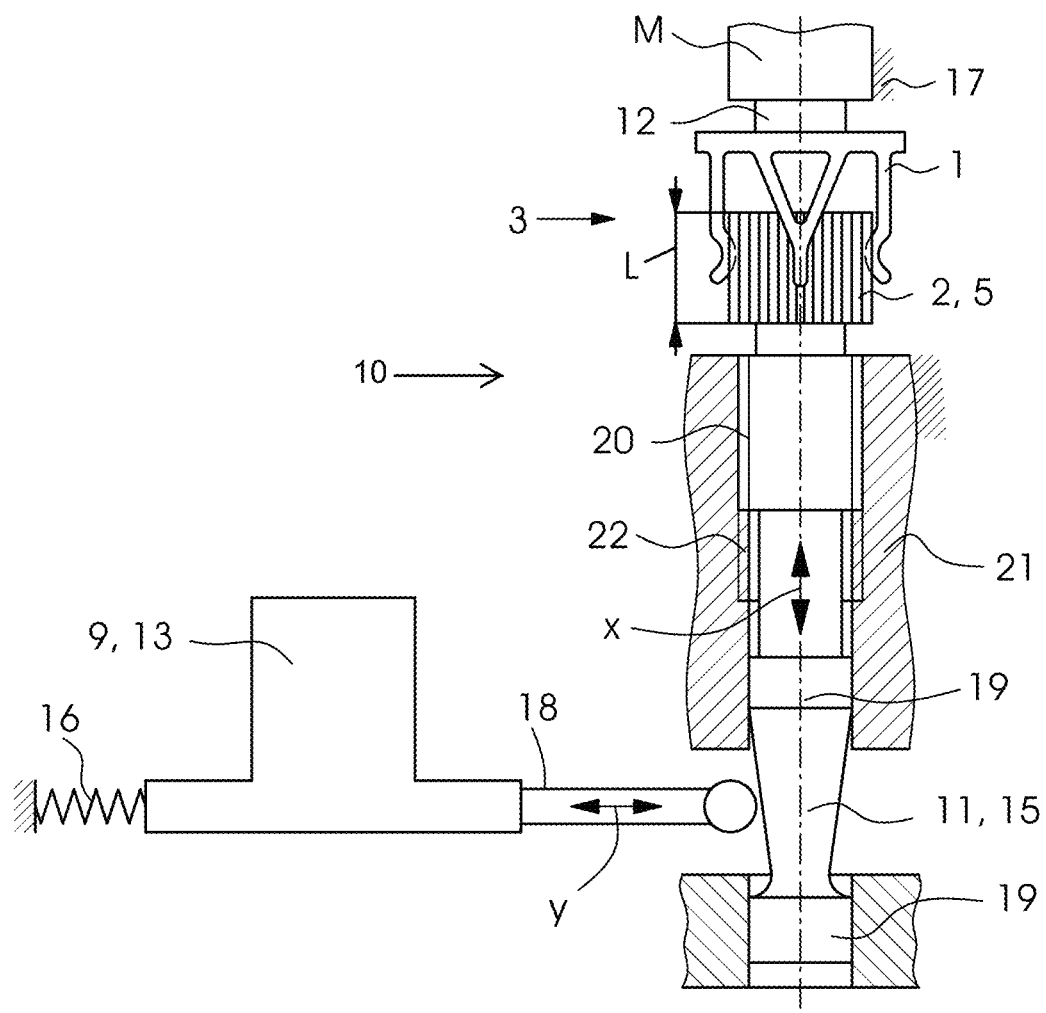
FIG. 2 is a fragmentary, longitudinal-sectional view of an adjustment device of the print bar with a compensation coupling.

FIG. 2 illustrates one of the print heads 9 and one of the adjustment devices 10. A compensation coupling 3 couples the stop 15 with an electric motor M, which is fixed to a frame 17. The motor M is preferably a stepping motor. The print head 9 is carried by mount 18 that rests against the stop 15. However, it would be possible for the print head 9 itself to rest against the stop 15. The stop 15 is embodied as a cone and forms a portion of a screw 11. The screw 11 may be referred to as an adjustment shaft or taper shaft.

Apart from the stop 15, the screw 11 has further portions, namely fittings 19 as journal bearings and an external thread 20. The stop 15 is located between the fittings 19. The fittings 19 are disposed for sliding movement in one or more components 21. The component 21 has an internal thread 22 into which the external thread 20 is screwed. Together, the screw 11 and the component 21 form a worm gearing for a translatory adjustment of the stop 15 in a direction x. The direction x corresponds to the axis of rotation of the screw 11.

Together with the stop 15, the print head 9 or the mount 18 thereof forms a wedge-type gearing that converts the movement of the stop 15 in the x direction into a movement of the print head 9 in a y direction perpendicular to the x direction. In accordance with FIG. 2, an adjustment of the stop 15 in a downward direction causes the stop 15 to push the print head 9 to the left-hand side against the action of the spring 16. An adjustment of the stop 15 in an upward direction causes space to be created for an adjustment of the print head 9 by using the spring 16 towards the right-hand side of the stop 15.

Through the use of the compensation coupling 3, the motor M rotates the screw 11, screwing it a little further into the component 21 or a little further out of the latter as a function of the direction of the adjustment. The compensation coupling 3 connects the screw 11 to a shaft 12, which is the motor shaft of the motor M if a motor-driven adjustment of the screw 11 is envisaged like in the example provided herein. However, manual adjustment of the screw 11 would likewise be possible. For this purpose, a handle such as a knob would be attached to the shaft 12 instead of the motor M. The compensation coupling 3 includes a first coupling half 1 and a second coupling half 2. In the coupled state, the two coupling halves 1, 2 are connected for co-rotation.

The first coupling half 1 may be fixed to the shaft 12 or formed thereon. The second coupling half 2 may be fixed on the screw 11 or formed thereon. The second coupling half 2 may form a head at the end of the screw 11.

Figure 3:
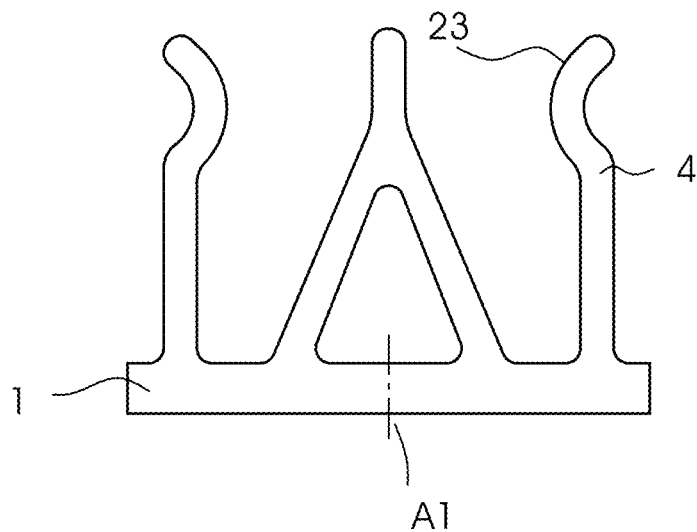
FIG. 3 is a side-elevational view of a first coupling half of the compensation coupling of FIG. 2.

FIG. 3 shows that the first coupling half 1 includes a set of spring claws that are evenly distributed about an axis of rotation A1 of the first coupling half 1. Every spring claw 4 is formed of a spring arm and an entrainment claw having a blade which has an inward curvature 23. The curvatures 23 on the spring claws 4 provide an angular compensation between axes of rotation A1, A2 of the coupling halves 1, 2. The curvatures 23 roll off on the second coupling half 2, together forming a type of ball joint or universal joint. The first coupling half 1 is the socket and the second coupling half 2 is the ball of the compensation coupling 3.

The second coupling half 2 is a gear with a toothing 5 on its outer circumference, specifically a spur gear. As viewed from the axial direction, the second coupling half 2 has the shape of a star. The compensation coupling 3 acts as a quick-acting coupling: an operator fits the first coupling half 1 onto the second coupling half 2 without any tools to connect the screw 11 with the motor M. The spring claws 4 are radially flexible and move slightly away from one another when being fitted together. The toothing 5 has teeth 7 with a length L that is greater than a maximum adjustment distance of the screw 11 between its lowest and highest screw positions or end positions. Thus, the spring claws 4 will remain engaged with the toothing 5 regardless of the screw position of the screw 11, providing compensation for any axial displacement of one coupling half 1, 2 relative to the other.

Figure 4:
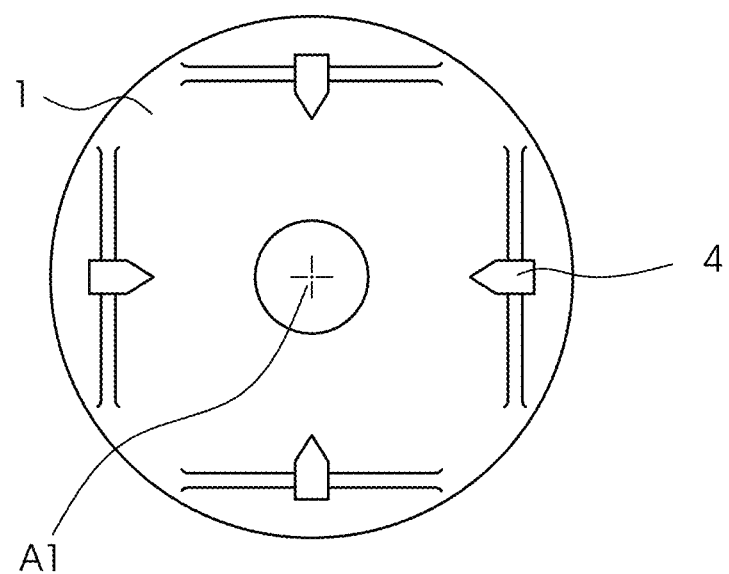
FIG. 4 is a top-plan view of the first coupling half of FIG. 3.

FIG. 4 shows that the first coupling half has four spring claws 4, which are disposed in pairs, with the two spring claws 4 of each pair facing one another diametrically.

Figure 5:
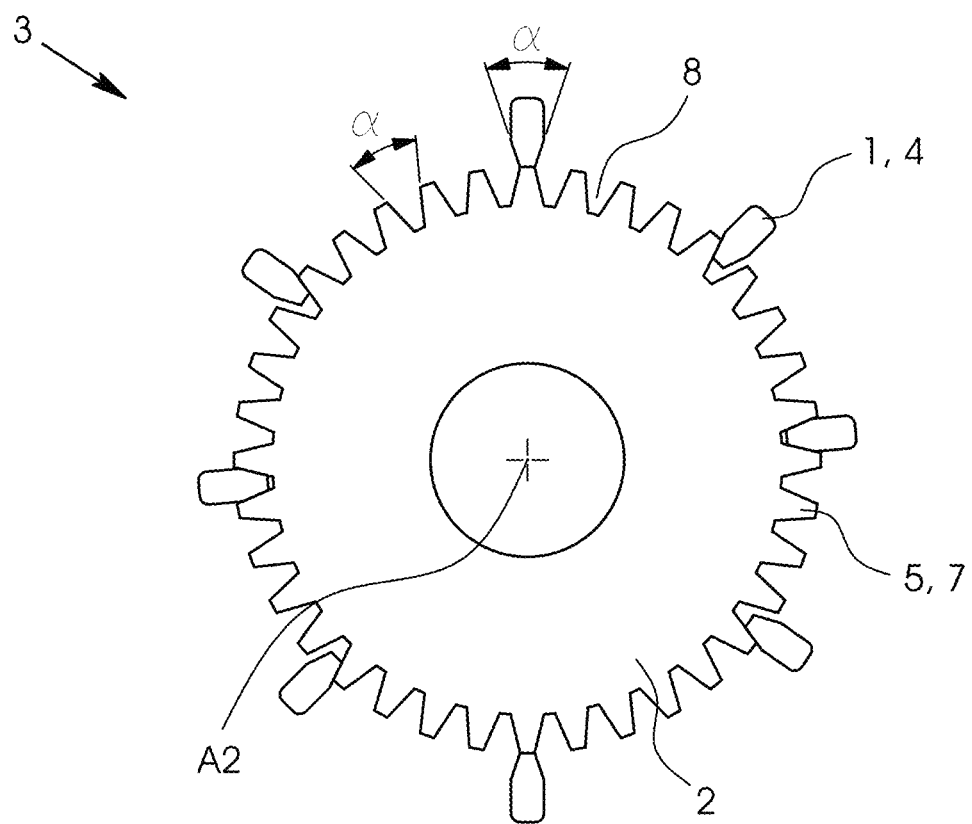
FIGS. 5, 6 and 7 are top-plan views of various modifications of the first coupling half and a second coupling half of the compensation coupling of FIG. 2.

FIG. 5 illustrates an alternative embodiment having twice the number of spring claws 4 as compared to FIG. 4.

Figure 6:
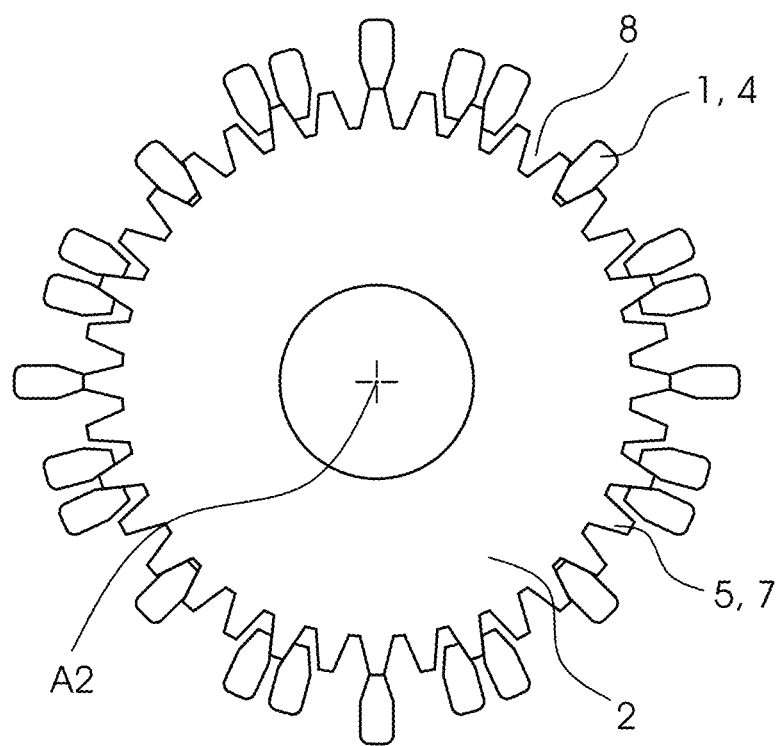

FIG. 6 illustrates a further embodiment having even more spring claws 4 that are unevenly distributed along the circumference.

Figure 7:
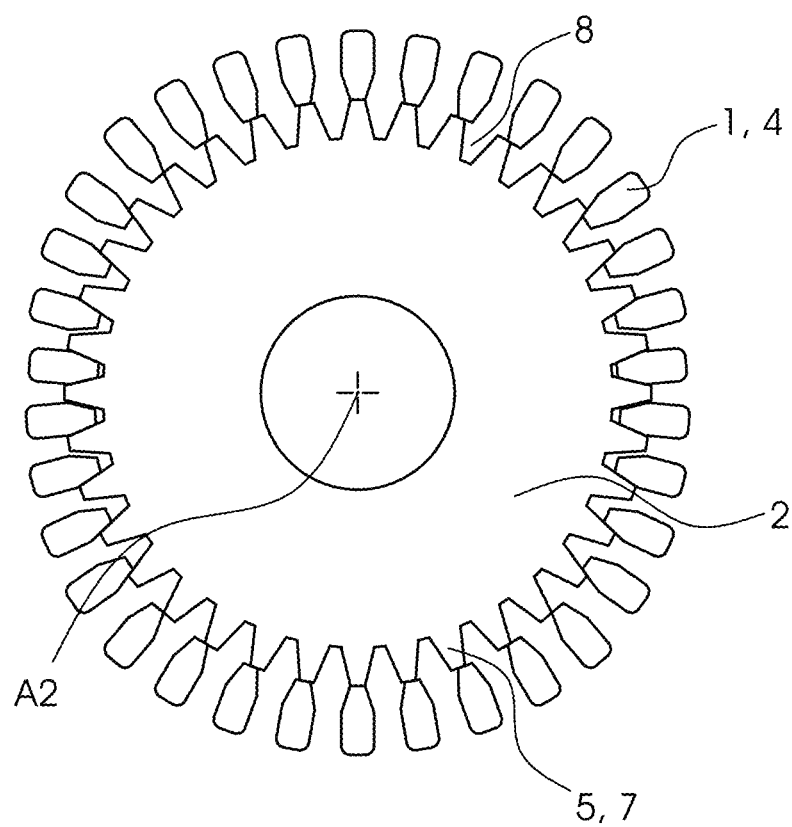

FIG. 7 illustrates an embodiment in which the number of spring claws 4 almost equals the number of teeth 7 of the toothing 5.

In all of the exemplary embodiments shown in FIGS. 2 to 7, the number of spring claws 4 is smaller than the number of teeth 7. Thus, the pitch of the toothing 5 and the pitch of the spring claws 4 differ from one another. The different pitches ensure that in every angular position of the first coupling half 1 relative to the second coupling half 2, there is at least one (preferably more than one) spring claw 4 that fully engages in gaps 8 between the teeth 7 of the toothing 5 and one or more spring claws 4 that only partly engages in the gaps 8 and/or one or more spring claws 4 that do not engage in the gaps 8 at all and rest against the tips of the teeth 7. Thus, a reliable transmission of torque without play is possible.

A flank angle $\alpha$ of the spring claws 4 may be provided in such a way as to ensure that when torque is transmitted, a self-locking action is in effect due to flank friction between the spring claws 4 and the teeth 7 to prevent the spring claws 4 from moving out of engagement due to centrifugal forces.

The following is a summary list of reference numerals and the corresponding structure used in the above description of the invention:
1 first coupling half
2 second coupling half
3 compensation coupling
4 spring claw
5 toothing
7 tooth
8 gap
9 print head
10 adjustment device
11 screw 12 shaft
13 print bar
15 stop
16 spring
17 frame
18 mount
19 fitting
20 external thread
21 component
22 internal thread
23 curvature
A1 axis of rotation (of the first coupling half 1)
A2 axis of rotation (of the second coupling half 2)
L length
M motor
x direction
y direction
α flank angle

The invention claimed is:

1. A print bar for inkjet printing, the print bar comprising:
    print heads disposed in a row;
    adjustment devices for adjusting said print heads relative to one another, each of said adjustment devices including at least one screw and at least one shaft for rotating said at least one screw; and
    a compensation coupling interconnecting said screw and said shaft, said compensation coupling including:
        a first coupling half and a second coupling half configured to fit together under elastic deformation;
        said first coupling half including spring claws having a first pitch, said first coupling half being disposed on said shaft;
        said second coupling half including a toothing having a second pitch, said second coupling half being disposed on said screw; and
        said first and second pitches differing from one another.

2. The print bar according to claim 1, wherein said first coupling half is a wheel and said spring claws are resilient in a radial direction.

3. The print bar according to claim 1, wherein said second coupling half is a star.

4. The print bar according to claim 1, wherein said toothing has a specific length to provide axial compensation.

5. The print bar according to claim 1, wherein said spring claws transmit torque.

6. The print bar according to claim 1, wherein said first coupling half has a number of said spring claws, and said toothing has a number of teeth being greater than said number of said spring claws.

7. The print bar according to claim 1, wherein a subset of said spring claws engages in gaps of said toothing and another subset of said spring claws does not engage in said gaps, when said coupling halves are fitted into one another.

8. The print bar according to claim 1, which further comprises a motor, said shaft being a motor shaft of said motor.

* * * * *